US011921558B1

(12) United States Patent
Udhayan et al.

(10) Patent No.: US 11,921,558 B1
(45) Date of Patent: Mar. 5, 2024

(54) USING NETWORK TRAFFIC METADATA TO CONTROL A PROCESSOR

(71) Applicant: Intel Corporation, Santa Clara, CA (US)

(72) Inventors: Venkateshan Udhayan, Portland, OR (US); Sravan Akepati, Portland, OR (US); Ashraf H. Wadaa, Beaverton, OR (US); Shahrnaz Azizi, Cupertino, CA (US); Kristoffer Fleming, Chandler, AZ (US); Ajay Gupta, Portland, OR (US); Binu John, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/060,002

(22) Filed: Nov. 30, 2022

(51) Int. Cl.
*G06F 1/28* (2006.01)
*G06F 15/173* (2006.01)

(52) U.S. Cl.
CPC .......... *G06F 1/28* (2013.01); *G06F 15/17331* (2013.01)

(58) Field of Classification Search
CPC .............................. G06F 1/28; G06F 15/17331
See application file for complete search history.

(56) References Cited

U.S. PATENT DOCUMENTS

| 5,629,594 A | 5/1997 | Jacobus et al. |
| 6,047,308 A | 4/2000 | Grummer et al. |
| 7,903,579 B2 | 3/2011 | Hughes et al. |
| 8,484,857 B2 | 7/2013 | Demianovich et al. |
| 9,798,629 B1 | 10/2017 | Shilane et al. |
| 10,345,890 B2 | 7/2019 | Wei et al. |
| 10,802,877 B2 | 10/2020 | Lin et al. |
| 2014/0254369 A1* | 9/2014 | Kulkarni ................. H04L 12/12 370/252 |
| 2017/0024243 A1 | 1/2017 | Kishan et al. |
| 2020/0133707 A1* | 4/2020 | Coster ..................... G06F 1/329 |
| 2020/0366578 A1* | 11/2020 | Punj ...................... H04L 43/028 |
| 2021/0011630 A1 | 1/2021 | Zhu et al. |
| 2021/0041929 A1* | 2/2021 | Connor ................... H04L 12/10 |

OTHER PUBLICATIONS

Andrea Fortuna, "Forensic Artifacts: evidences of program execution on Windows systems," May 23, 2018, 5 pages total.
Intel Corporation, "Intel® Dynamic Platform and Thermal Framework (DPTF) for Chromium OS," Feb. 18, 2020, 3 pages total.

(Continued)

*Primary Examiner* — Terrell S Johnson
(74) *Attorney, Agent, or Firm* — Trop, Pruner & Hu, P.C.

(57) ABSTRACT

In one embodiment, a processor includes: a plurality of cores to execute instructions; a power controller to control power consumption of the plurality of cores, the power controller to receive network traffic metadata from a classifier and control the power consumption of at least one of the plurality of cores based at least in part on the network traffic metadata; and a hardware feedback circuit coupled to the plurality of cores, the hardware feedback circuit to determine hardware feedback information comprising an energy efficiency capability and a performance capability of at least some of the plurality of cores based at least in part on the network traffic metadata. Other embodiments are described and claimed.

20 Claims, 10 Drawing Sheets

(56) References Cited

OTHER PUBLICATIONS

Intel Corporation, "12th Gen Intel® Core™: performance hybrid architecture," date unknown, 1 page.
Intel Corporation, "Intel® Fact Sheet: Intel Unveils Biggest Architectural Shifts in a Generation for CPUs, GPUs and IPUs," 2021, 10 pages total.
Intel Corporation, "Intel Architecture Day 2021 Presentation," 2021, 195 pages total.
U.S. Appl. No. 17/954,411, filed Sep. 28, 2022, entitled "Dynamically Adjusting Thread Affinitization Using Hardware-Based Core Availability Notifications," by Russell J. Fenger et al.

* cited by examiner

USING NETWORK TRAFFIC METADATA TO CONTROL A PROCESSOR

BACKGROUND

In client computing systems, multiple applications can execute concurrently at any given point in time. In most cases, applications handle one or more network traffic streams. Different traffic streams possess different characteristics that define Quality of Service (QoS) constraints on a networking sub-system to manage individual applications/streams.

DETAILED DESCRIPTION

Figure 1:
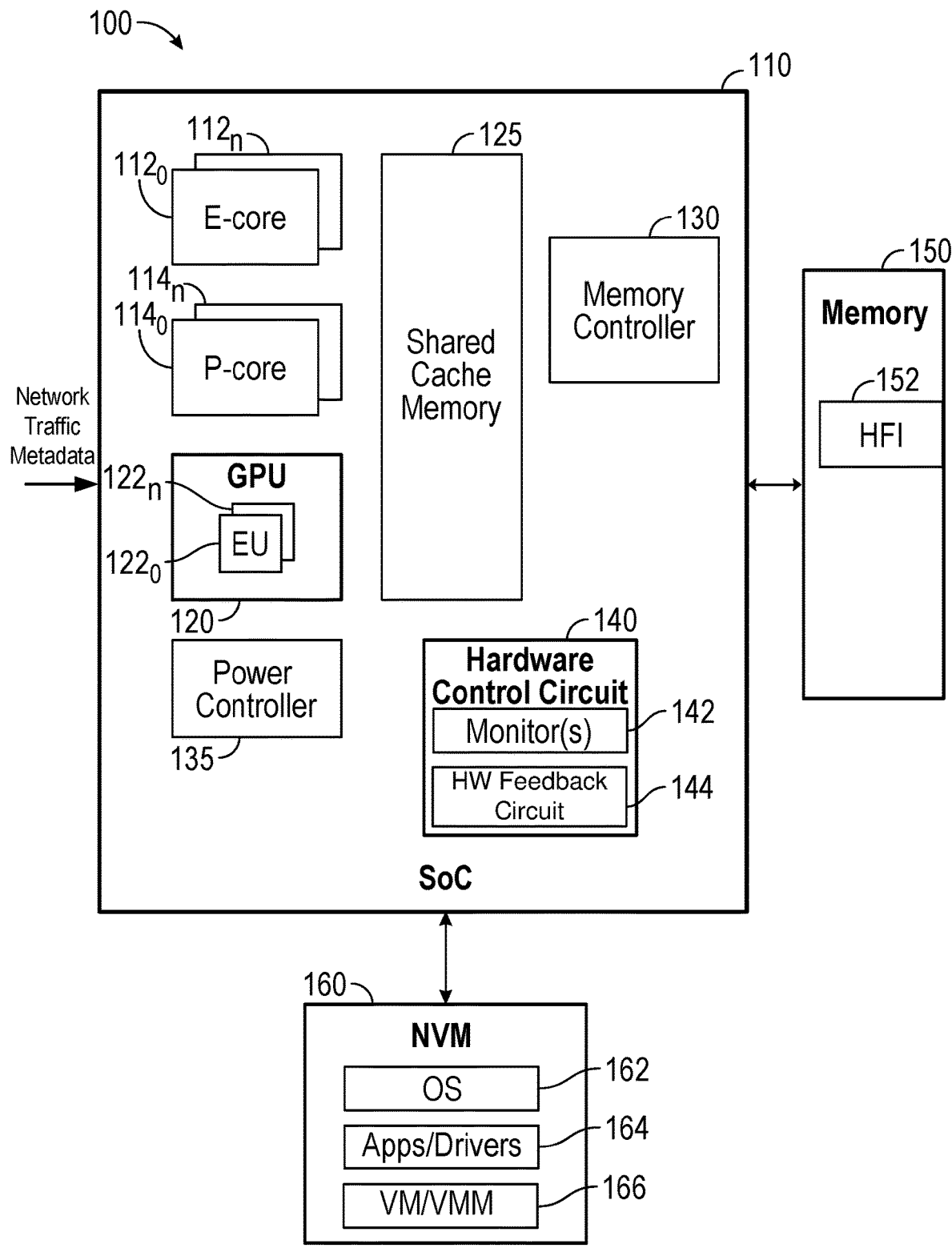
FIG. 1 is a block diagram of a system in accordance with an embodiment.

In various embodiments, hardware circuitry is configured to analyze network traffic to determine network traffic metadata. This metadata, which may be generated using machine learning/artificial intelligence (ML/AI), can be provided to various microcontrollers in a system. The microcontrollers may be both internal to a processor or other system on chip (SoC) and included in other system components. In this way, SoC hardware itself and an operating system (OS) scheduler may become aware of network traffic and base power management policy and/or scheduling decisions based at least in part on this information. Since many if not most workloads in certain platforms are done through (wireless) connectivity, this network traffic metadata may be used as a primary indicator in applying power versus performance policies.

Although embodiments are not limited in this regard, a variety of different power management policy decisions may be based at least in part on traffic-aware hints in accordance with an embodiment. Receiving entities of such hints may include: a power management unit/microcontroller; a hardware feedback circuit; an OS scheduler; and a memory controller.

In one or more embodiments, network traffic characteristics may be mapped during run-time into SoC power management policy changes in real-time to optimize for SoC power and performance and/or user experience. Such network traffic metadata may include network type, network stream concurrency, and other network characteristics. In one or more embodiments, this network traffic metadata may include information carried in transmission control protocol/internet protocol (TCP/IP), user datagram protocol (UDP), real-time transport protocol (RTP) headers and underlying wireless protocols, including physical and media access control (MAC) layer information to classify the type of network stream in real-time and/or non-real time. As examples, real-time traffic can include conferencing calls (video, voice) or virtual reality (VR) and/or augmented reality (AR), and gaming usages, and non-real-time traffic can include video streaming, file transfer, productivity applications and browser applications.

This metadata may be considered in power management decisions to achieve optimal user experience characteristics that relate to responsiveness, performance, acoustics, thermal and battery life. For example, based at least in part on such metadata, power management policies may be controlled, e.g., to favor battery life, operate in a quiet-cool mode of operation, among other considerations. With one or more embodiments, multiple data sources like SoC telemetry, platform telemetry, and traffic-aware stream telemetry may be collectively considered for co-optimizing SoC power management policy and platform sub-systems.

In an embodiment, the network traffic metadata may be used to identify particular incoming network traffic as being of real-time or non-real-time workloads. Some examples of non-real-time workloads may include file transfer, cloud synchronization, cloud file download, which with this identification can be scheduled on power efficient cores. Examples of real-time workloads include user-interactive workloads such as gaming, conference calling (voice), most of the UDP stream, and low latency usages like multi-device wireless screen sharing, VR/AR usages, among others.

Referring now to Table 1, shown is an example mix of workloads that may be identified using network traffic metadata in accordance with an embodiment.

TABLE 1

| | | Time | | | | | | | | | |
|---|---|---|---|---|---|---|---|---|---|---|---|
| | | T0 | T1 | T2 | T3 | T4 | T5 | T6 | T7 | T8 | T9 |
| Traffic class | None | N | | | | | | | | | |
| | Conferencing | | | | C | C | C | | | | |
| | Streaming | | | | | | | | | | |
| | Gaming | | | | | | | | | | |
| | Browsing/productivity | | P | P | P | P | P | P | P | | |
| | File transfer | | | | | | | F | F | | |
| | Other | | O | | | O | | | | | |
| | Events | (N) | (P,O) | (P) | (C,P) | (C,P,O) | (C,P) | (P,F) | (P,F) | | |

N—None  P—Productivity  C—Conferencing  F—File Transfer  O—Other

With this information, a memory controller that controls a memory hierarchy (e.g., including random access memory, system cache, and so forth) may opportunistically reduce CPU interrupts by making a decision to allocate incoming network traffic in the system cache versus system memory, thereby improving power savings for non-real-time workloads. In contrast, for real-time/latency sensitive workloads (as determined based at least in part on the network traffic metadata), the memory controller may configure the memory hierarchy to deliver data on arrival to the CPU to improve application responsiveness (rather than buffering such data in the system cache). By providing and using traffic-aware hints, embodiments may realize an optimal use of the system cache, e.g., sharing the system cache with multiple IP's (storage, Wi-Fi, audio, display, etc.).

Referring now to FIG. 1, shown is a block diagram of a system in accordance with an embodiment. As shown in FIG. 1, computing system 100 may be any type of computing device, ranging from a relatively small device such as a smartphone to larger devices, including laptop computers, desktop computers, server computers or so forth. In the high level shown in FIG. 1, an SoC 110 couples to a memory 150 which is a system memory (e.g., a dynamic random-access memory (DRAM)), and a non-volatile memory 160 which in different embodiments can be implemented as a flash memory, disk drive or so forth. Understand that the terms "system on chip" or "SoC" are to be broadly construed to mean an integrated circuit having one or more semiconductor dies implemented in a package, whether a single die, a plurality of dies on a common substrate, or a plurality of dies at least some of which are in stacked relation. Thus as used herein, such SoCs are contemplated to include separate chiplets, dielets, and/or tiles, and the terms "system in package" and "SiP" are interchangeable with system on chip and SoC.

With respect to SoC 110, included are a plurality of cores. In the particular embodiment shown, two different core types are present, namely first cores $112_0$-$112_n$ (so-called efficiency cores (E-cores)) and second cores $114_{0-n}$ (so-called performance cores (P-cores)). As further shown, SoC 110 includes a graphics processing unit (GPU) 120 including a plurality of execution units (EUs) $122_{0-n}$. In one or more embodiments, first cores 112 and second cores 114 and/or GPU 120 may be implemented on separate dies.

These various computing elements couple to additional components of SoC 110, including a shared cache memory 125, which in an embodiment may be a last level cache (LLC) having a distributed architecture. In addition, a memory controller 130 is present along with a power controller 135, which may be implemented as a hardware control circuit that may be a dedicated microcontroller to execute instructions, e.g., stored on a non-transitory storage medium (e.g., firmware instructions). In other cases, power controller 135 may have different portions that are distributed across one or more of the available cores.

In embodiments herein, network traffic metadata, e.g., as generated in a ML classifier (such as included in a wireless adapter, which may be external from SoC 110), can be provided to various hardware circuitry including memory controller 130 and power controller 135, to enable better efficiency and power consumption. Power controller 135 may use this network traffic metadata in decision making of processor power management (PPM).

Still with reference to FIG. 1, SoC 110 further includes a hardware control circuit 140 independent of power controller 135. In various embodiments herein, hardware control circuit 140 may be configured to monitor operating conditions, e.g., using one or more monitors 142. Based at least in part on the monitored operating conditions, a hardware feedback circuit 144 of hardware control circuit 140 may maintain hardware feedback information, which may dynamically indicate processor capabilities, e.g., with respect to performance and efficiency. Hardware feedback circuit 144 may use this network traffic metadata in decision making of energy performance preferences (EPP). In one embodiment, hardware feedback circuit 144 may update information present in an interface structure stored in memory 150. Specifically, a hardware feedback interface (HFI) 152 may be stored in memory 150 that includes information regarding, inter alia, efficiency and performance levels of various cores. Hardware control circuit 140 also may receive the network traffic metadata.

When this information is updated, hardware control circuit 140 may communicate, e.g., via an interrupt, to an OS 162. As illustrated, NVM 160 may store OS 162, various applications, drivers and other software (generally identified at 164), and one or more virtualization environments 166 (generally identified as VMM/VM 166). In one instantiation, communication of hardware feedback information to OS 162 may be via Intel® Thread Director technology, implemented at least in part in hardware feedback circuit 144.

Understand while shown at this high level in the embodiment of FIG. 1, many variations and alternatives are possible, and other implementations of SoC 100 can equally incorporate embodiments. For example depending on market segment, an SoC can include, instead of a hybrid product having heterogeneous core types, only cores of a single type. Further, more or different accelerator types may be present. For example, in addition to or instead of GPUs, an SoC may include a direct streaming accelerator (DSA), field programmable gate array (FPGA) or other accelerator, any or all of which may receive and use network traffic metadata in accordance with an embodiment.

Figure 2:
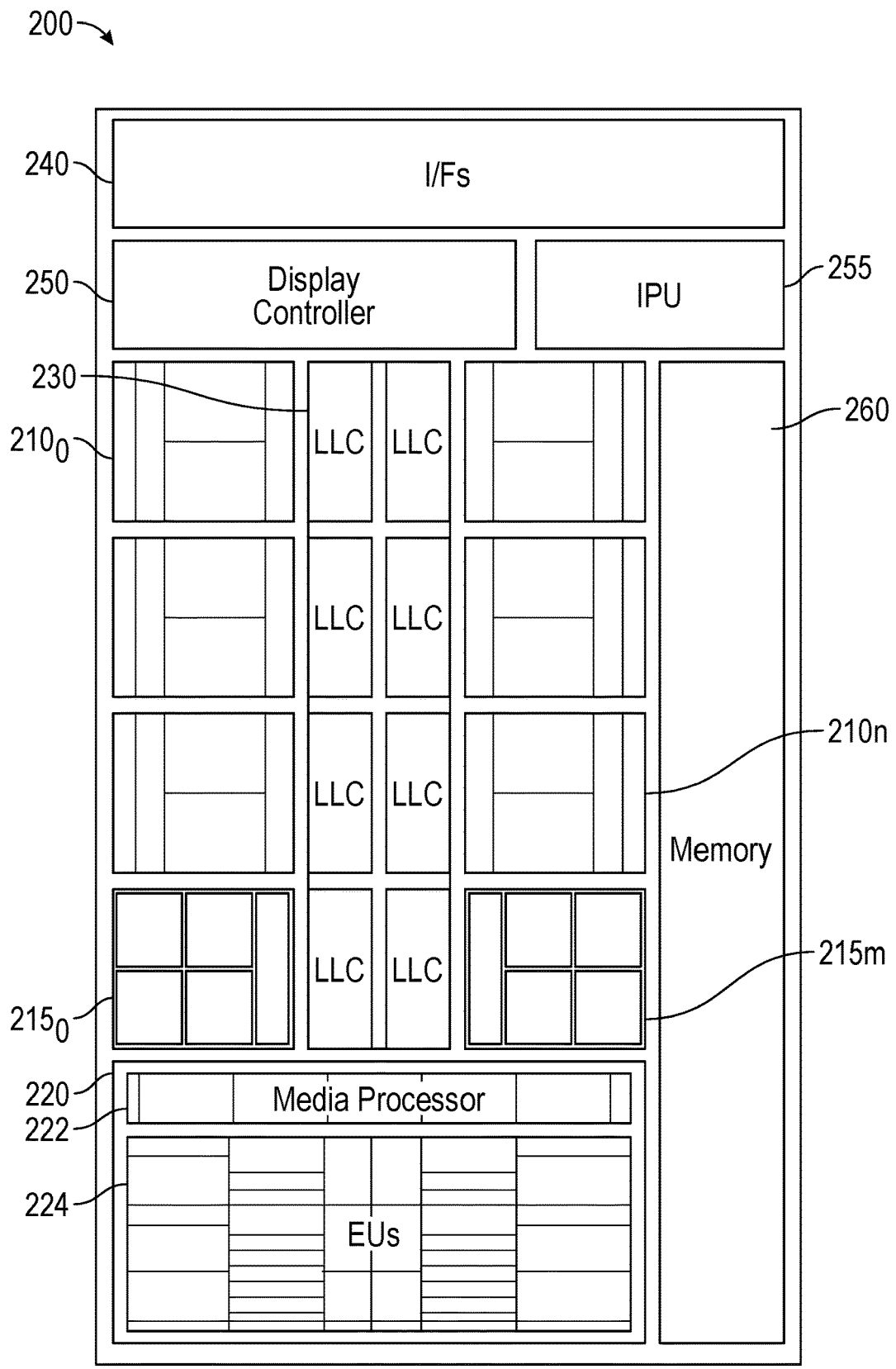
FIG. 2 is block diagram of a system on chip (SoC) in accordance with an embodiment.

Referring now to FIG. 2, shown is a block diagram of an SoC in accordance with another embodiment. More specifically as shown in FIG. 2, SoC 200 is a multicore processor, including a first plurality of cores $210_{0-n}$ and a second plurality of cores $215_{0-m}$. In one or more embodiments, first cores 210 may be implemented as performance cores, in that they may include greater amounts of circuitry (and wider and deeper pipelines) to perform more advanced computations in a performant manner. In contrast, second cores 215 may be configured as smaller cores that consume less power and may perform computations in a more efficient manner (e.g., with respect to power) than first cores 210. In certain implementations, first cores 210 may be referred to as P-cores (for performance cores) and second cores 215 may be referred to as E-cores (for efficiency cores). Note that different numbers of first and second cores may be present in different implementations.

As further illustrated in FIG. 2, a cache memory 230 may be implemented as a shared cache arranged in a distributed manner. In one or more embodiments, cache memory 230 may be a LLC having a distributed implementation in which one or more banks are associated with each of the cores.

As further illustrated, a GPU 220 may include a media processor 222 and a plurality of EUs 224. Graphics processor 220 may be configured for efficiently performing graphics or other operations that can be broken apart for execution on parallel processing units such as EUs 224.

Still referring to FIG. 2, various interface circuitry 240 is present to enable interface to other components of a system. Although embodiments are not limited in this regard, such interface circuitry may include a Peripheral Component Interconnect Express (PCIe) interface, one or more Thunderbolt™ interfaces, an Intel® Gaussian and Neural Accelerator (GNA) coprocessor and so forth. Also illustrated, processor 200 includes a display controller 250 and an image processing unit (IPU) 255.

As further shown, SoC 200 also includes a memory 260 that may provide memory controller functionality for interfacing with a system memory such as DRAM. Understand while shown at this high level in the embodiment of FIG. 2, many variations and alternatives are possible. Note that in this implementation, separate power controller circuitry such as power controller 135 and hardware control circuit 140 of FIG. 1 is not separately shown. Depending upon implementation such components may be separate circuits present within SoC 200 or this functionality may be performed by one or more of first and/or second cores or other processing unit.

With embodiments herein, SoC 200 may be configured to receive network traffic metadata and provide this information to various microcontrollers such as power controllers, hardware feedback circuitry, memory controllers and so forth.

Figure 3:
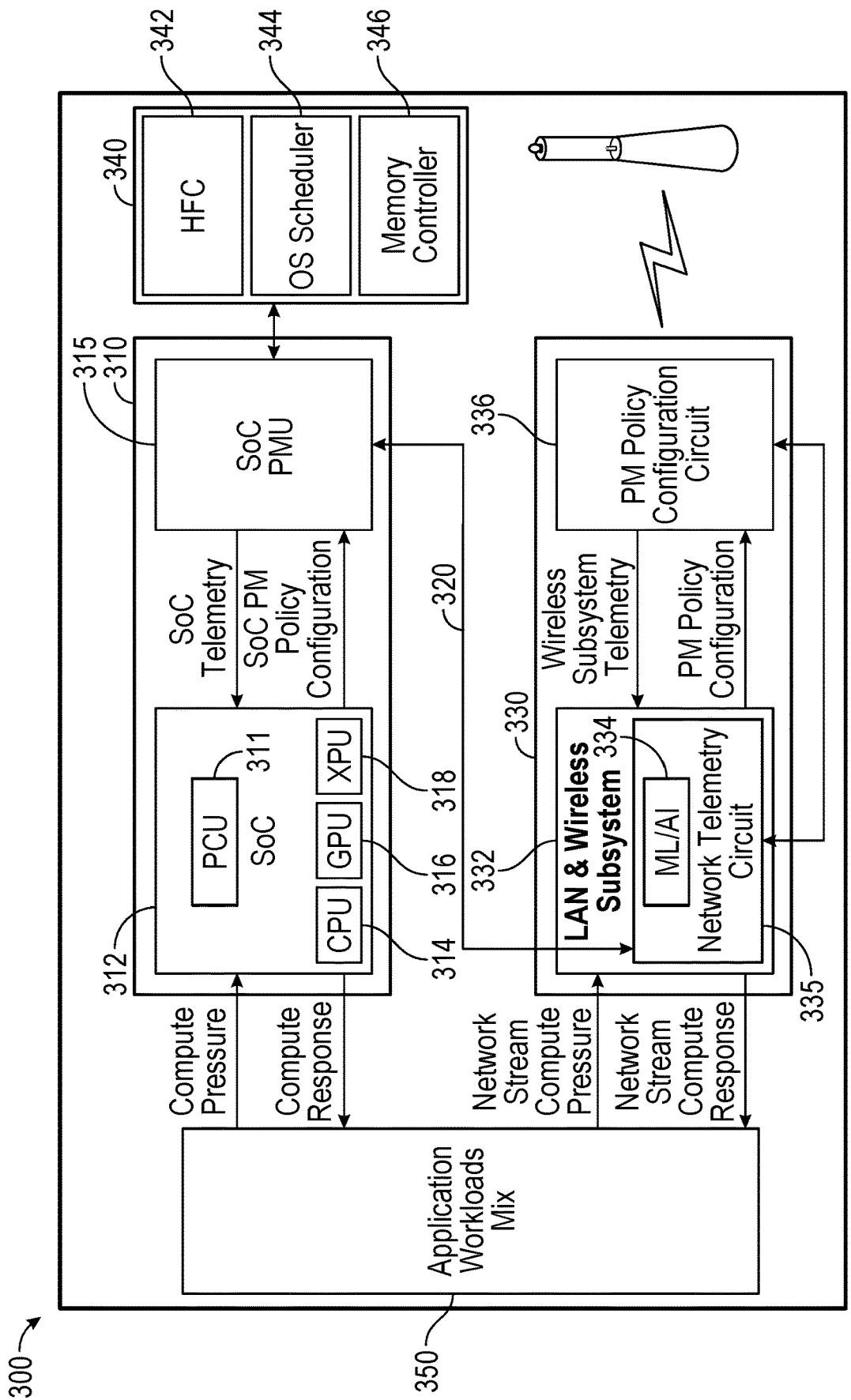
FIG. 3 is a high level block diagram illustrating an environment in accordance with an embodiment.

Referring now to FIG. 3, shown is a high-level block diagram illustrating an environment in accordance with an embodiment. As shown in FIG. 3, an environment 300 may be part of any type of computing device, ranging from small portable devices, such as smartphones, laptops or so forth, to larger devices such as client systems or server systems. In the high level shown, a system includes an SoC 310 coupled via a link 320 with a communication device 330. In different embodiments, communication device 330 may be a wired or wireless module. Although shown as separate components, understand that in some cases a single package may include components of SoC 310 and communication device 330.

With embodiments, communication device 330 may provide network traffic metadata via link 320, which in one embodiment may be implemented as a sideband link such as a sideband path of a PCIe or IOSF interconnect. In an embodiment, this network traffic metadata may be communicated in the form of vendor defined messages (VDMs), although embodiments are not limited in this regard.

In the arrangement of FIG. 3, SoC 310 includes an SoC die 312 and a second die 315 which may include peripheral circuitry including a power management circuit (PMC). In the high level shown in FIG. 3, SoC die 312 includes central processing unit (CPU) circuitry 314, graphics processing unit (GPU) circuitry 316 and additional processing circuitry (XPU) 318 (such as an accelerator). In addition, SoC die 312 further includes a power control unit (PCU) 317 which, in various embodiments, may be implemented as a dedicated microcontroller. In other cases, PCU 317 may execute on one or more cores of CPU circuitry 314.

Further while in this implementation, SoC 310 is illustrated as including two separate dies, understand in other embodiments a single die package or additional dies such as separate CPU and GPU dies may be present. For example, as discussed above in some implementations, an SoC may include multiple compute dies such as a first compute die that includes cores of a first type of core and a second compute die that includes cores of a second type of core.

With reference now to communication device 330, included is a wireless subsystem 332 that in turn includes a network telemetry circuit 335. Communication device 330 may be implemented as a network interface controller (NIC) or other communication circuit (including a wireless and/or wired subsystems). In embodiments herein, network telemetry circuit 334 includes a classifier 335 which may be implemented as an ML/AI classifier. In one or more embodiments, classifier 335 may be implemented as a neural network that is configured to identify network traffic types, e.g., based on incoming network traffic. A policy configuration circuit 336 couples to wireless subsystem 332 and may provide a power management policy configuration that is based at least in part on wireless subsystem telemetry and network traffic metadata as determined in classifier 335. Wireless subsystem may, based at least in part on network traffic metadata, adaptively change interrupt coalescing interval and/or latency tolerance reporting (LTR) to allow for SoC 310 to sleep for longer durations. Similarly, PCU 317 and/or PMU 315 may, based at least in part on network traffic metadata, dynamically control core frequency/voltage, core selections and so forth.

In environment 300 a variety of different application workloads 350 may execute. Based on the amount and type of activity, a compute pressure metric may be provided to SoC 312 (and more specifically to PCU 315). In turn, SoC 312 may provide a compute response that may update a mix and/or otherwise control one or more workloads based on such compute pressure metric. Similarly, based on the activity amount and type, a network stream compute pressure metric may be provided to communication device 330 (and more specifically to network telemetry circuit 334). In turn, communication device 330 may provide a network stream compute response that may update a mix and/or otherwise control one or more workloads.

As further illustrated in FIG. 3, various control entities may optimize power and performance capabilities and user experience based at least in part on network traffic metadata. Thus as shown further in FIG. 3, the network traffic metadata provided from communication device 330 to SoC 310 via link 320 may, in turn, be provided to various control entities 340.

In the representative implementation of FIG. 3, these control entities include an Intel® Thread Director implementation, shown as a hardware feedback circuit 342, which may be used to provide hardware guided scheduling to identify appropriate core types on which to schedule workloads, an OS scheduler 344 that schedules threads to appropriate cores, and a memory controller 346, which may control memory configuration and operation of at least portions of a memory hierarchy based at least in part on this network traffic metadata. Although shown at this high level in the embodiment of FIG. 3, many variations and alternatives are possible. Further understand that the illustration of FIG. 3 is shown from a logical point of view in which delineations between hardware, software and firmware are abstracted.

Figure 4:
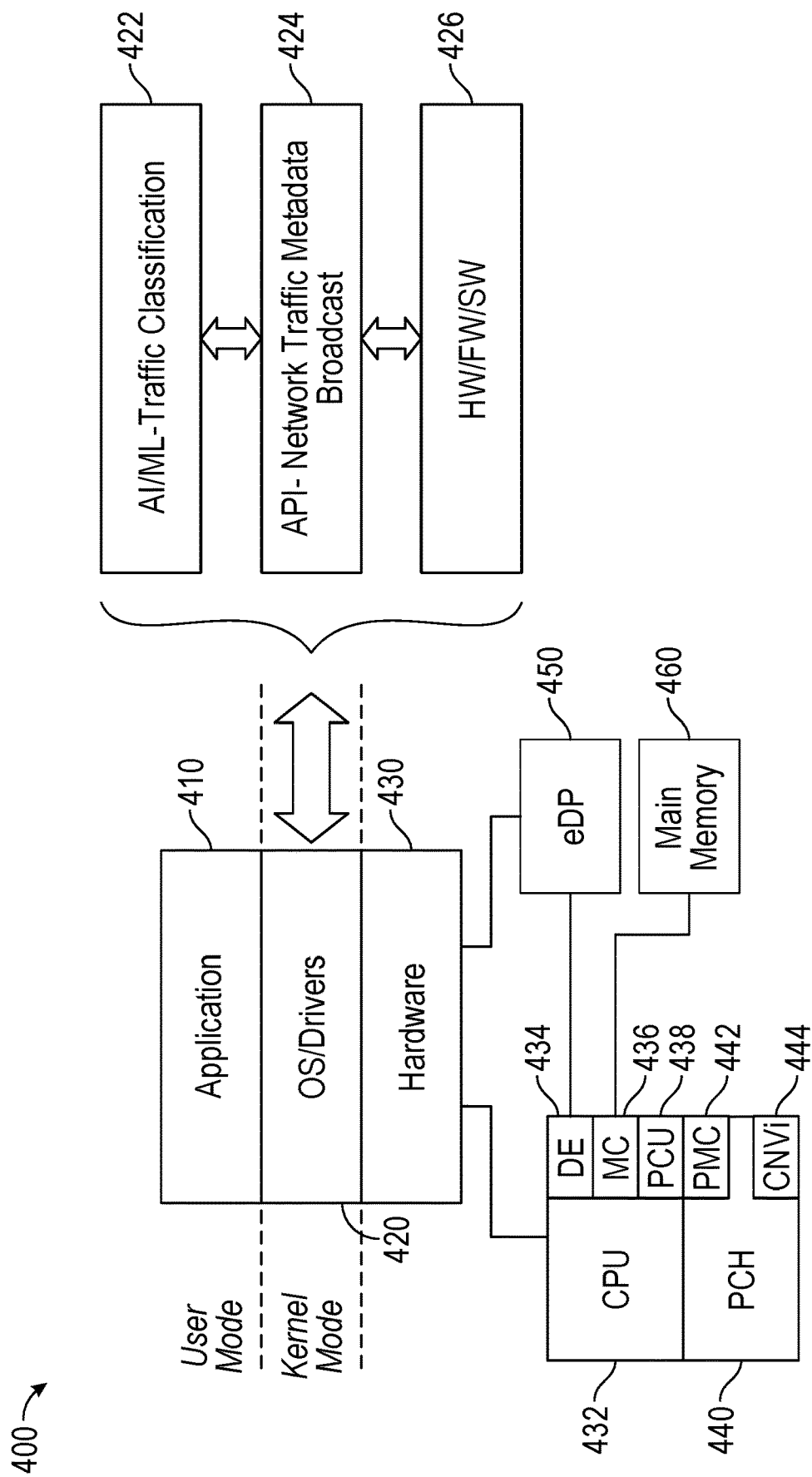
FIG. 4 is a diagram illustrating communication of network traffic metadata in accordance with an embodiment.

Referring now to FIG. 4, shown is a diagram illustrating communication of network traffic metadata in accordance with an embodiment. As shown in FIG. 4, an environment 400 includes one or more applications 410 that operate in a user mode. Applications 410 execute on an OS/driver stack 420 of a kernel mode. All such software in turn executes on hardware 430. In the representative high level illustration of FIG. 4, hardware 430 includes a CPU 432 which may be implemented as one or more semiconductor dies. In FIG. 4, CPU 432 includes, in addition to core circuitry (not shown for ease of illustration), a display engine 434 that may control an associated display 450. CPU 432 also includes a memory controller 436 to control a memory 460 such as a DRAM, and a PCU 438 which may control power consumption within CPU 432. Hardware 430 further includes a peripheral controller hub (PCH) 440 that includes its own power management circuit (PMC) 442 and further includes a converged input/output circuit (CNVi) 444.

To leverage network traffic metadata in accordance with an embodiment, an AI/ML traffic classifier 422 may execute. In one or more embodiments, classifier 422 may be implemented within a wireless module or other communication circuit. Based upon analysis of incoming network traffic, classifier 422 may identify one or more types of workflows.

In the embodiment of FIG. 4, classifier 422 may communicate network traffic metadata via an application programming interface (API) 424 that carries the metadata extracted from a NIC to make interaction with hardware and perform necessary actions. As shown, API 424 enables communication of the network traffic metadata to various hardware/firmware/software 426 which in a representative embodiment may include appropriate hardware such as PCU 438, PMC 442 and memory controller 436. Other destinations may include firmware such as power management code. In addition, the network traffic metadata may be provided to various software such as an OS scheduler, an intelligent platform framework or other such software/firmware.

Figure 5:
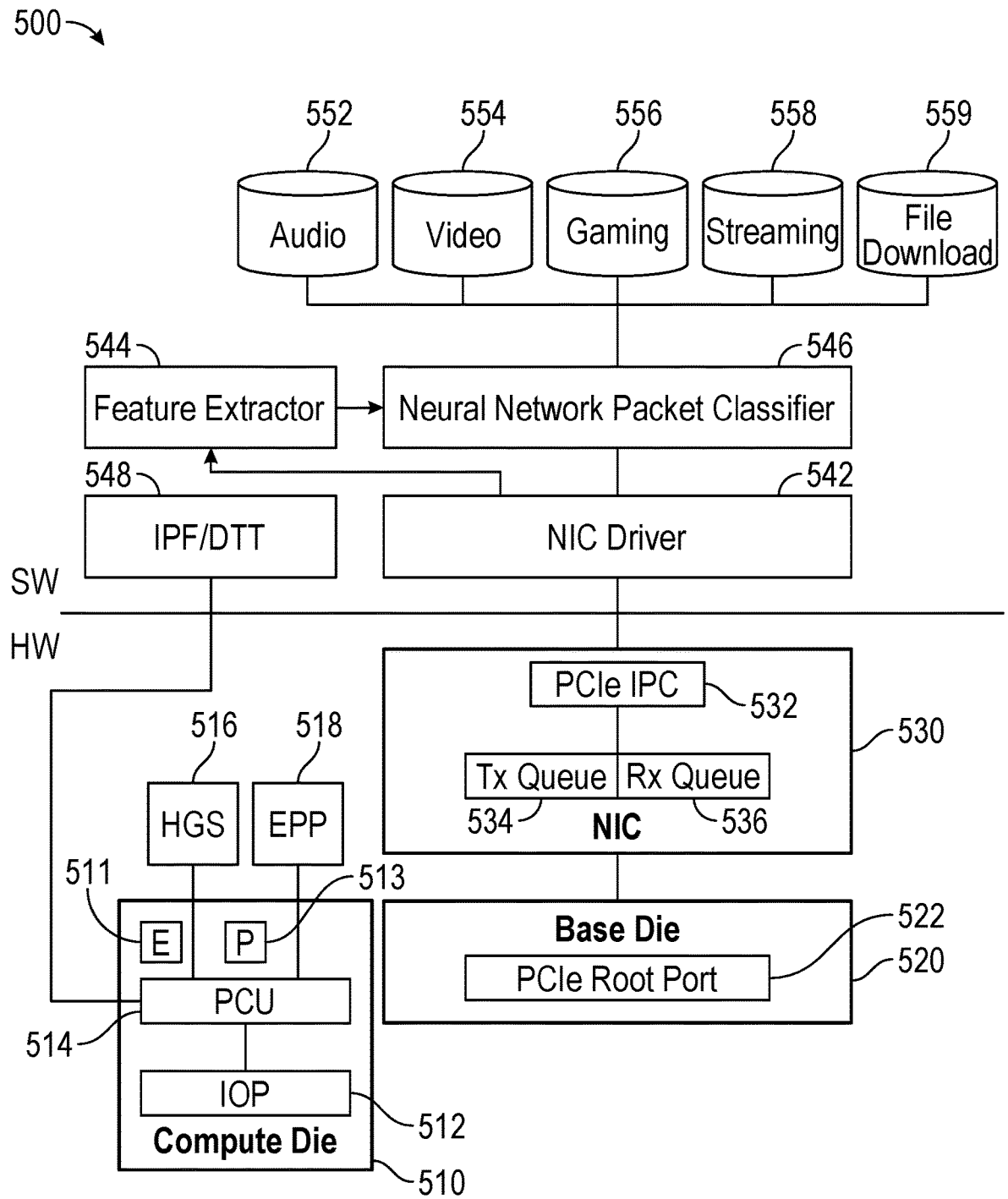
FIG. 5 is a block diagram of interaction between a classifier in accordance with an embodiment and various hardware and software entities.

Referring now to FIG. 5, shown is a block diagram of interaction between a classifier in accordance with an embodiment and various hardware and software entities that receive and use network traffic metadata to optimize power, performance, and user experience. First with reference to hardware of a system 500, at least one compute die 510 is present. In the high level of FIG. 5, compute die 510 includes one or more efficiency cores 511 and one or more performance cores 513. Such cores may have their power consumption (e.g., in the form of voltage and/or frequency) controlled by a PCU 514. PCU 514, in turn, communicates with an IO processor 512 that may interact with a base die 520, itself including a PCIe root port 522.

PCU 514 may control power consumption of the cores based at least in part on hardware guided scheduling (HGS) information 516 and/or energy performance preference (EPP) information 518, along with network traffic metadata, e.g., received via an Intelligent Platform Framework, Dynamic Thermal Tuning (IPF/DTT) platform software framework 548 to interact to hardware, including but not limited to power management circuity, storage, display and others.

As further illustrated, base die 520 is in communication with a NIC 530, which may be a modem such as a Wi-Fi module or other wired or wireless (e.g., 5G or 6G) communication circuit. Incoming packets received via a PCIe inter-processor communication (IPC) circuit 520 coupled between NIC 530 and compute die 510 may be provided towards base die 520 via a receive queue 530 and outgoing packets provided from base die 520 may be communicated through a transmit queue 534.

Still with reference to FIG. 5, a software model of system 500 includes a NIC driver 542 (which may execute within NIC 530). NIC driver 542 may provide packet-based information to a feature extractor 544, which may extract various features of incoming packets of the network traffic. Although embodiments are not limited in this regard, such packet information may include inter-packet arrival rates, protocol IDs, packet size, IP addresses, process ID, wireless PHY and MAC (L1 & L2 layer information, network bandwidth, and so forth.

As shown, this extracted packet information is provided to a neural network packet classifier 546. In an embodiment, classifier 546 may be implemented as a deep neural network model for traffic classification. A trained model of classifier 546 may be built by utilizing many parameters extracted such as inter-packet arrival times, packet sizes, packet flow direction, addresses, port numbers, etc. Based at least in part on this information and a trained model, classifier 546 may generate network traffic metadata. Such network traffic metadata may include an indication of a type of network traffic (e.g., one or more of audio traffic 552, video traffic 554, gaming traffic 556, streaming traffic 558, and file download traffic 559). Although shown with these specific traffic types for illustration, understand that additional or different traffic types may be identified and included in network traffic metadata in other cases. In some embodiments, network traffic metadata may further include information regarding workload type, server latency (e.g., based on inter-arrival time to articulate data arrival time), network bandwidth, and/or signal level information. In operation, classifier 546 may analyze packets of network streams to infer the workload for that stream running on the host and infer the workload type (real time, non-real time, high throughput, interactive). Understand while shown at this high level in the embodiment of FIG. 5, many variations and alternatives are possible.

Embodiments may thus improve SoC power consumption, which may improve battery life for battery-operated devices. SoC power savings may be realized by selecting an appropriate CPU frequency specific to the type of workflow, heterogenous architecture scheduling may be based at least in part on workflow to schedule on performance core and efficient cores, and system caches for network IPs may be allocated to buffer more data by avoiding limited IO SRAM availability and reducing DRAM access and CPU interrupts. Based at least in part on network traffic metadata, data from the system cache can be passed through via DRAM or directly to the memory controller and to the CPU.

Figure 6A:
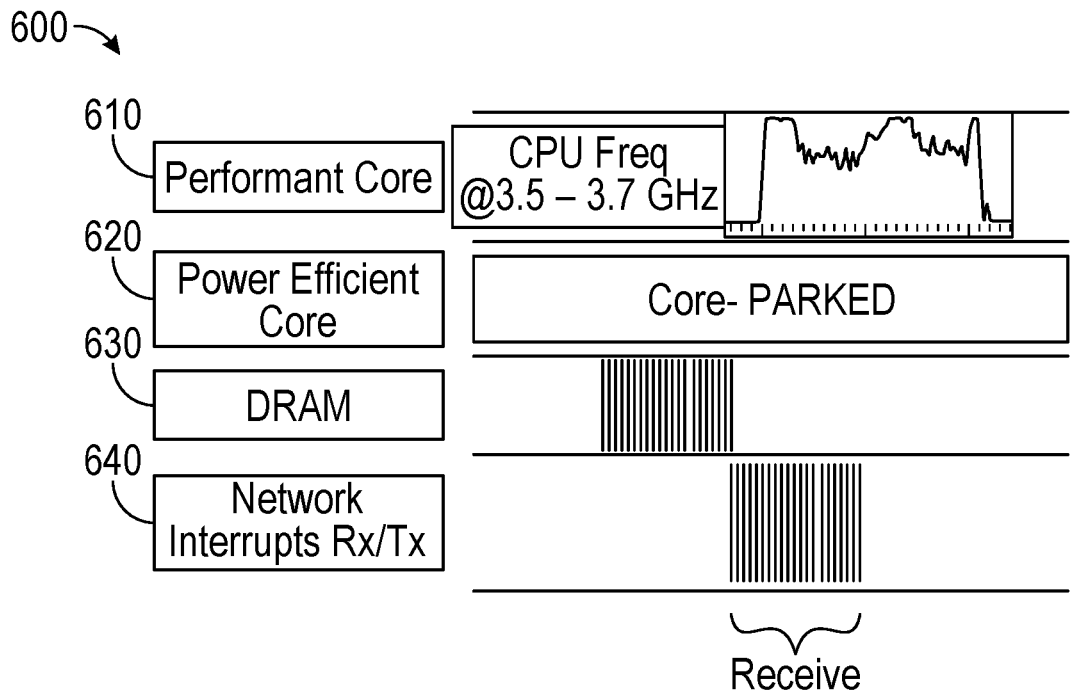
FIGS. 6A-6B is a timing diagram illustrating power management opportunities realized using an embodiment.
Figure 6B:
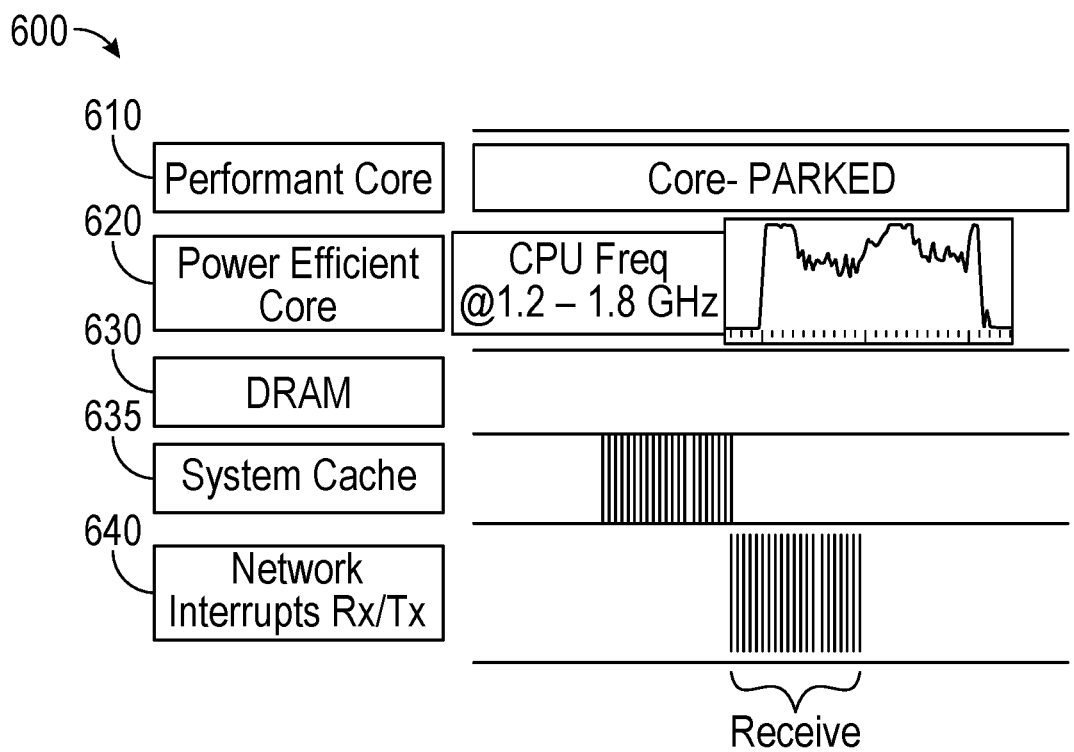

Referring now to FIGS. 6A-6B, shown is a timing diagram illustrating power management opportunities realized using an embodiment. More specifically as shown in FIG. 6A, in a system 600 including one or more performant cores 610 and one or more power efficient cores 620 during a typical workload, a power efficient core 620 may be in a parked state and a performant core 610 may operate at a relatively high operating frequency (e.g., between 3.5-3.7 gigahertz (GHz)). While such high-performance operation may be appropriate for certain compute-intensive workloads, it is not efficient nor conducive for power consumption to operate at this level when a workload such as a file transfer workload is executing.

As shown in FIG. 6A, system 600 further includes a system memory 630 (implemented as DRAM). As data is stored into memory 630, a plurality of network interrupts 640 occur, which can increase power consumption. Thus in this naive implementation in which network traffic metadata is not considered in power consumption polices, this file transfer workload executes on performant core 610, increasing power consumption unnecessarily.

In contrast, with reference to FIG. 6B, by using network traffic metadata in accordance with an embodiment, performant core 610 may be placed in a parked state and the file transfer workload instead may be performed on power efficient core 620 that operates at a lower operating frequency (e.g., between approximately 1.2-1.8 GHz). Also in this implementation, network buffering capabilities may be increased by providing the data of the file transfer instead to a system cache 635 (and not memory 630), e.g., based on an instantaneous size of opportunity. With this arrangement, a scalable network buffer enables reduced CPU interrupts. For example, the system cache can be provisioned as additional NIC buffers, which results in fewer CPU interrupts, and hence reduces CPU wakes.

Figure 7:
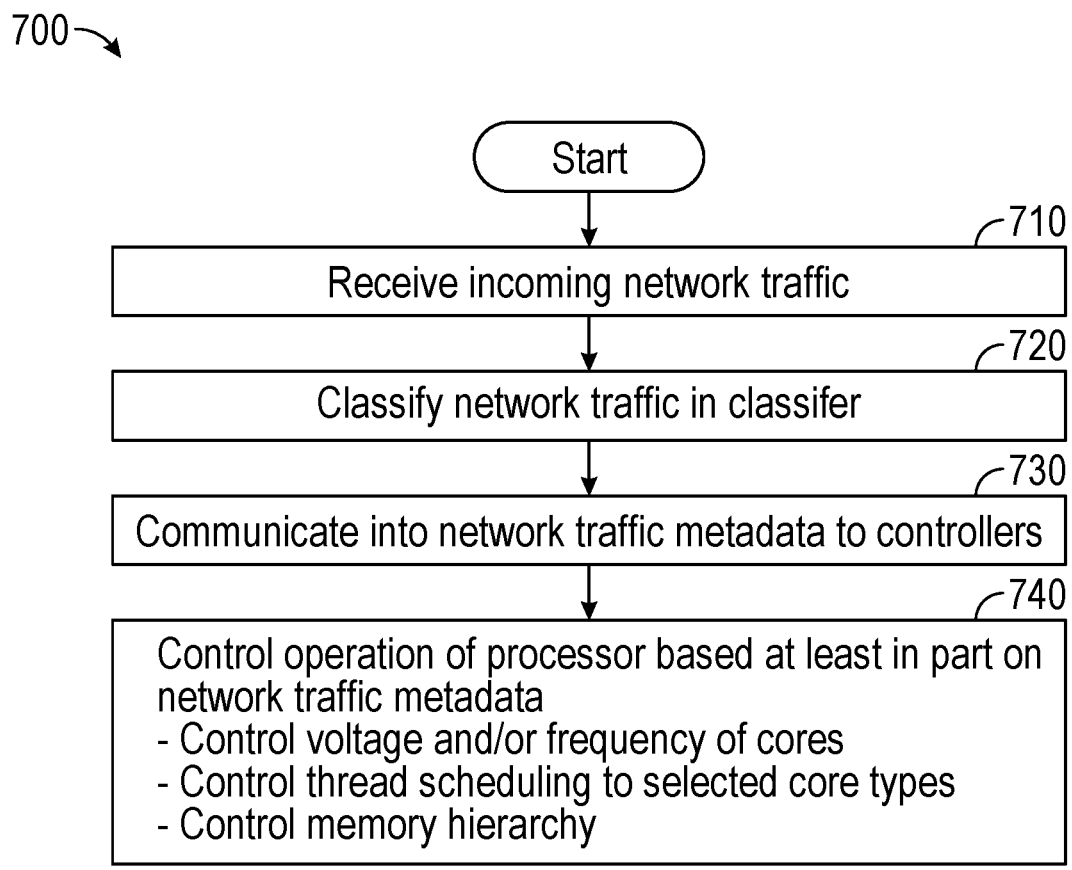
FIG. 7 is a flow diagram of a method in accordance with another embodiment.

Referring now to FIG. 7, shown is a flow diagram of a method in accordance with an embodiment. As shown in FIG. 7, method 700 is a method for controlling power consumption in a platform using network traffic metadata in accordance with an embodiment. In an embodiment, method 700 may be performed by various entities within a system, including a NIC or other communication circuit to receives and evaluates incoming network traffic, and one or more controllers that may control various aspects of platform behavior based at least in part on the network traffic metadata. As such, method 700 may be performed by hardware circuitry, possibly in combination with firmware and/or software.

As shown in FIG. 7, method 700 may begin by receiving incoming traffic, e.g., within a NIC (block 710). Next at block 720 this network traffic may be classified within a classifier, e.g., a ML classifier included within a NIC or other communication circuit. In other cases, other control circuitry may be configured to execute a ML/AI classifier to identify different network traffic. The ML classifier may be configured to identify different types of network traffic and associate to such network traffic different traffic classes, quality of service, workload identifications or so forth.

With further reference to FIG. 7, at block 730 network traffic metadata as generated by the ML classifier may be communicated to one or more controllers of the system. For example, these controllers may include a one or more power controllers, a memory controller, and/or other control circuits.

Still referring to FIG. 7, at block 740 operation of a processor of the system may be controlled based at least in part on this network traffic metadata. As illustrated, examples of this processor control may include: appropriate control of voltage and/or frequency of one or more cores or other processing circuits; thread scheduling to direct particular threads to certain core types (e.g., power efficient or performant cores) and controlling of a memory hierarchy such as described herein. Of course, in other embodiments additional control components of the system such as GPU's or so forth also may be occur using network traffic metadata. Although shown at high level in the embodiment of FIG. 7, many variations and alternatives are possible.

Using network traffic metadata, embodiments may avoid increasing frequency for network-bounded workloads. Embodiments may further reduce power consumption for file transfer workloads by performing the workload on a power efficient core at lower frequency (and/or lower memory frequency), while buffering incoming data. Platform power benefits like dynamic control of EPP values and DRAM frequency can also provide power saving opportunities. Embodiments can further be used in other platform components like GPU to be aware of traffic types.

Figure 8:
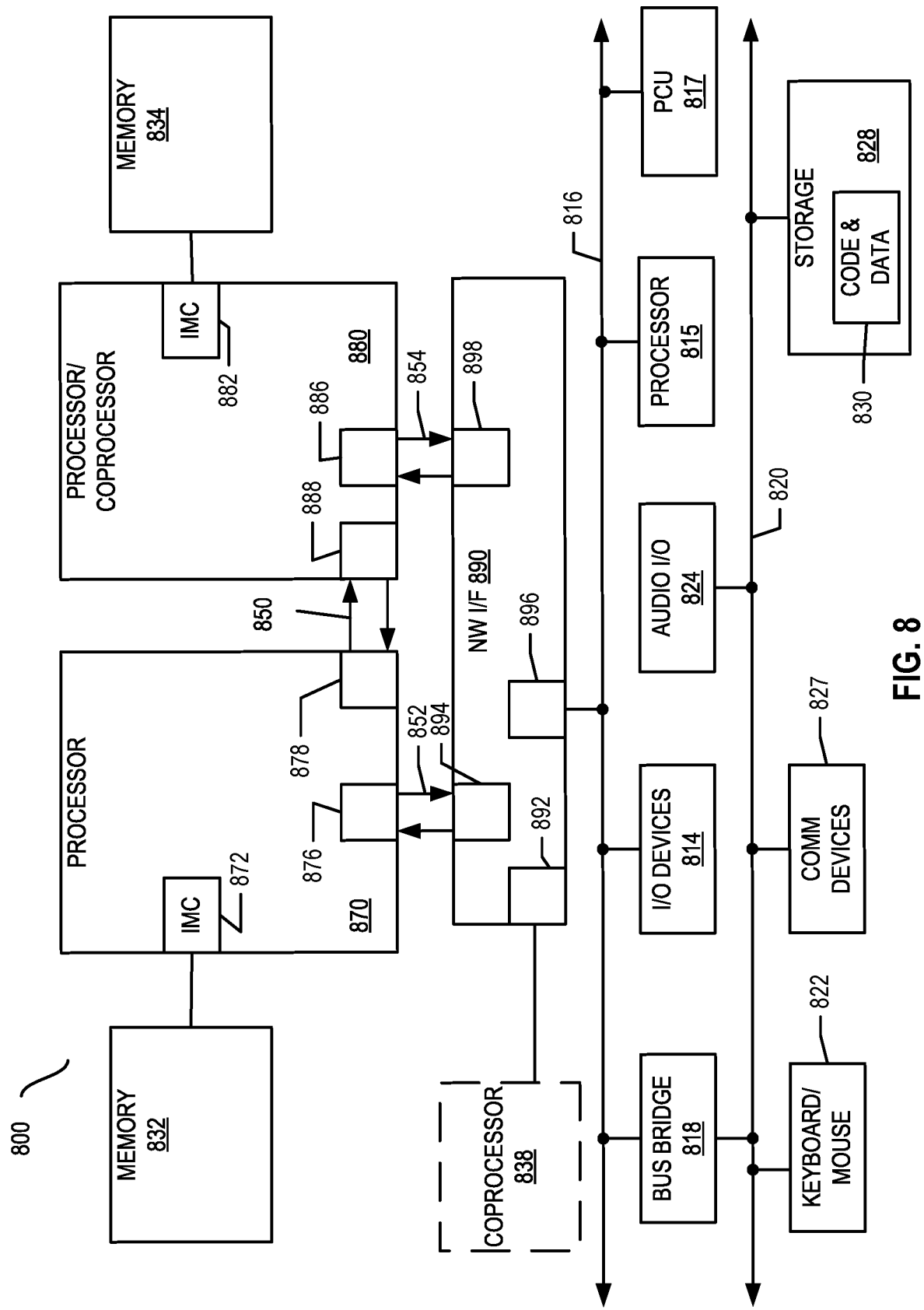
FIG. 8 illustrates an example computing system.

FIG. 8 illustrates an example computing system. Multiprocessor system 800 is an interfaced system and includes a plurality of processors or cores including a first processor 870 and a second processor 880 coupled via an interface 850 such as a point-to-point (P-P) interconnect, a fabric, and/or bus. In some examples, the first processor 870 and the second processor 880 are homogeneous. In some examples, first processor 870 and the second processor 880 are heterogenous. Though the example system 800 is shown to have two processors, the system may have three or more processors, or may be a single processor system. In some examples, the computing system is a SoC.

Processors 870 and 880 are shown including integrated memory controller (IMC) circuitry 872 and 882, respectively. Processor 870 also includes interface circuits 876 and 878; similarly, second processor 880 includes interface circuits 886 and 888. Processors 870, 880 may exchange information via the interface 850 using interface circuits 878, 888. IMCs 872 and 882 couple the processors 870, 880 to respective memories, namely a memory 832 and a memory 834, which may be portions of main memory locally attached to the respective processors. Processors 870, 880 also may control operation using network traffic metadata as described herein.

Processors 870, 880 may each exchange information with a network interface (NW I/F) 890 via individual interfaces 852, 854 using interface circuits 876, 894, 886, 898. The network interface 890 (e.g., one or more of an interconnect, bus, and/or fabric, and in some examples is a chipset) may optionally exchange information with a coprocessor 838 via an interface circuit 892. In some examples, the coprocessor 838 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 870, 880 or outside of both processors, yet connected with the processors via an interface such as P-P interconnect, such that either or both processors' local cache information may be stored in the shared cache if a processor is placed into a low power mode.

Network interface 890 may be coupled to a first interface 816 via interface circuit 896. In some examples, first interface 816 may be an interface such as a Peripheral Component Interconnect (PCI) interconnect, a PCI Express interconnect or another I/O interconnect. In some examples, first interface 816 is coupled to a power control unit (PCU) 817, which may include circuitry, software, and/or firmware to perform power management operations with regard to the processors 870, 880 and/or co-processor 838. PCU 817 provides control information to a voltage regulator (not shown) to cause the voltage regulator to generate the appropriate regulated voltage. PCU 817 also provides control information to control the operating voltage generated. In various examples, PCU 817 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 817 is illustrated as being present as logic separate from the processor 870 and/or processor 880. In other cases, PCU 817 may execute on a given one or more of cores (not shown) of processor 870 or 880. In some cases, PCU 817 may be implemented as a microcontroller (dedicated or general-purpose) or other control logic configured to execute its own dedicated power management code, sometimes referred to as P-code. In yet other examples, power management operations to be performed by PCU 817 may be implemented externally to a processor, such as by way of a separate power management integrated circuit (PMIC) or another component external to the processor. In yet other examples, power management operations to be performed by PCU 817 may be implemented within BIOS or other system software.

Various I/O devices 814 may be coupled to first interface 816, along with a bus bridge 818 which couples first interface 816 to a second interface 820. In some examples, one or more additional processor(s) 815, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 816. In some examples, second interface 820 may be a low pin count (LPC) interface. Various devices may be coupled to second interface 820 including, for example, a keyboard and/or mouse 822, communication devices 827 and storage circuitry 828. Storage circuitry 828 may be one or more non-transitory machine-readable storage media as described below, such as a disk drive or other mass storage device which may include instructions/code and data 830. Further, an audio I/O 824 may be coupled to second interface 820. Note that other architectures than the point-to-point architecture described above are possible. For example, instead of the point-to-point architecture, a system such as multiprocessor system 800 may implement a multi-drop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 9:
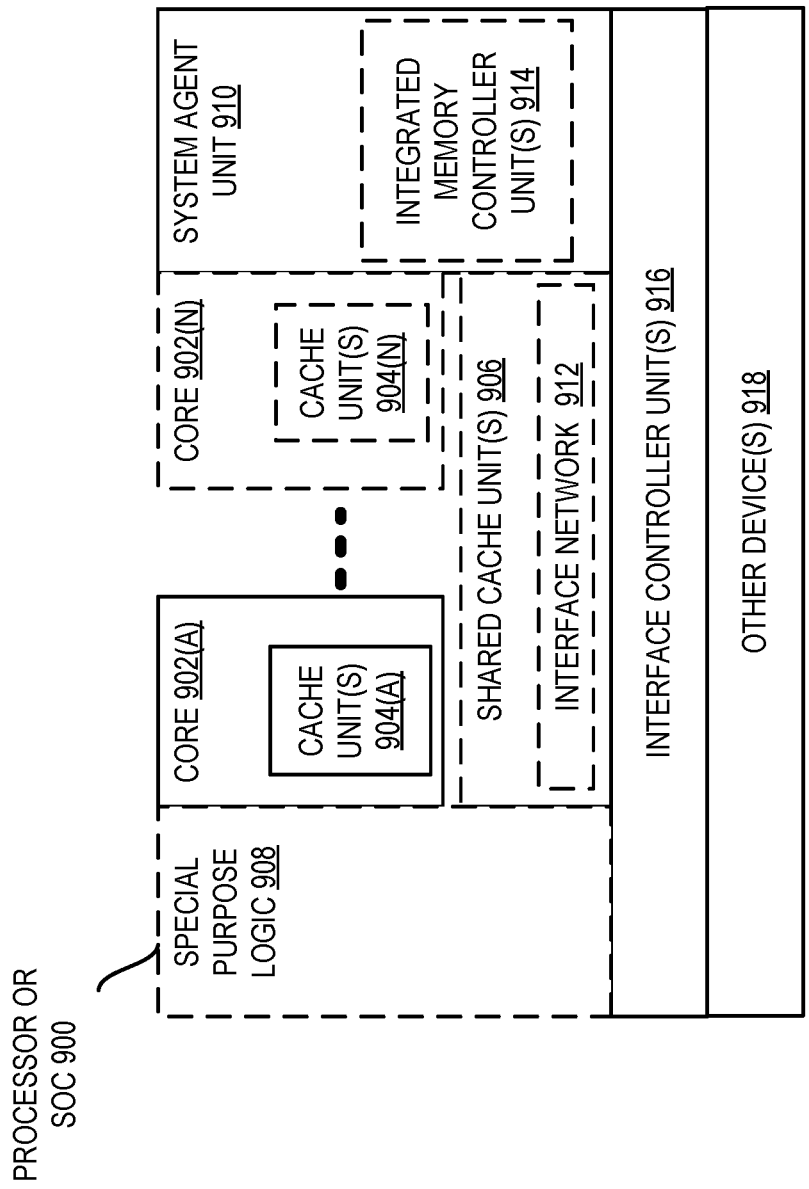
FIG. 9 illustrates a block diagram of an example processor and/or System on a Chip (SoC) that may have one or more cores and an integrated memory controller.

FIG. 9 illustrates a block diagram of an example processor and/or SoC 900 that may have one or more cores and an integrated memory controller. The solid lined boxes illustrate a processor 900 with a single core 902(A), system agent unit circuitry 910, and a set of one or more interface controller unit(s) circuitry 916, while the optional addition of the dashed lined boxes illustrates an alternative processor 900 with multiple cores 902(A)-(N), a set of one or more integrated memory controller unit(s) circuitry 914 in the system agent unit circuitry 910, and special purpose logic 908, as well as a set of one or more interface controller units circuitry 916. Note that the processor 900 may be one of the processors 870 or 880, or co-processor 838 or 815 of FIG. 8.

Thus, different implementations of the processor 900 may include: 1) a CPU with the special purpose logic 908 being integrated graphics and/or scientific (throughput) logic (which may include one or more cores, not shown), and the cores 902(A)-(N) being one or more general purpose cores (e.g., general purpose in-order cores, general purpose out-of-order cores, or a combination of the two); 2) a coprocessor with the cores 902(A)-(N) being a large number of special purpose cores intended primarily for graphics and/or scientific (throughput); and 3) a coprocessor with the cores 902(A)-(N) being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 904(A)-(N) within the cores 902(A)-(N), a set of one or more shared cache unit(s) circuitry 906, and external memory (not shown) coupled to the set of integrated memory controller unit(s) circuitry 914. The set of one or more shared cache unit(s) circuitry 906 may include one or more mid-level caches, such as level 2 (L2), level 3 (L3), level 4 (L4), or other levels of cache, such as a last level cache (LLC), and/or combinations thereof. While in some examples interface network circuitry 912 (e.g., a ring interconnect) interfaces the special purpose logic 908 (e.g., integrated graphics logic), the set of shared cache unit(s) circuitry 906, and the system agent unit circuitry 910, alternative examples use any number of well-known techniques for interfacing such units. In some examples, coherency is maintained between one or more of the shared cache unit(s) circuitry 906 and cores 902(A)-(N). In some examples, interface controller units circuitry 916 couple the cores 902 to one or more other devices 918 such as one or more I/O devices, storage, one or more communication devices (e.g., wireless networking, wired networking, etc.), etc.

In some examples, one or more of the cores 902(A)-(N) are capable of multi-threading. The system agent unit circuitry 910 includes those components coordinating and operating cores 902(A)-(N). The system agent unit circuitry 910 may include, for example, power control unit (PCU) circuitry and/or display unit circuitry (not shown). The PCU may be or may include logic and components needed for regulating the power state of the cores 902(A)-(N) and/or the special purpose logic 908 (e.g., integrated graphics logic). The display unit circuitry is for driving one or more externally connected displays.

The cores 902(A)-(N) may be homogenous in terms of instruction set architecture (ISA). Alternatively, the cores 902(A)-(N) may be heterogeneous in terms of ISA; that is, a subset of the cores 902(A)-(N) may be capable of executing an ISA, while other cores may be capable of executing only a subset of that ISA or another ISA.

Figure 10:
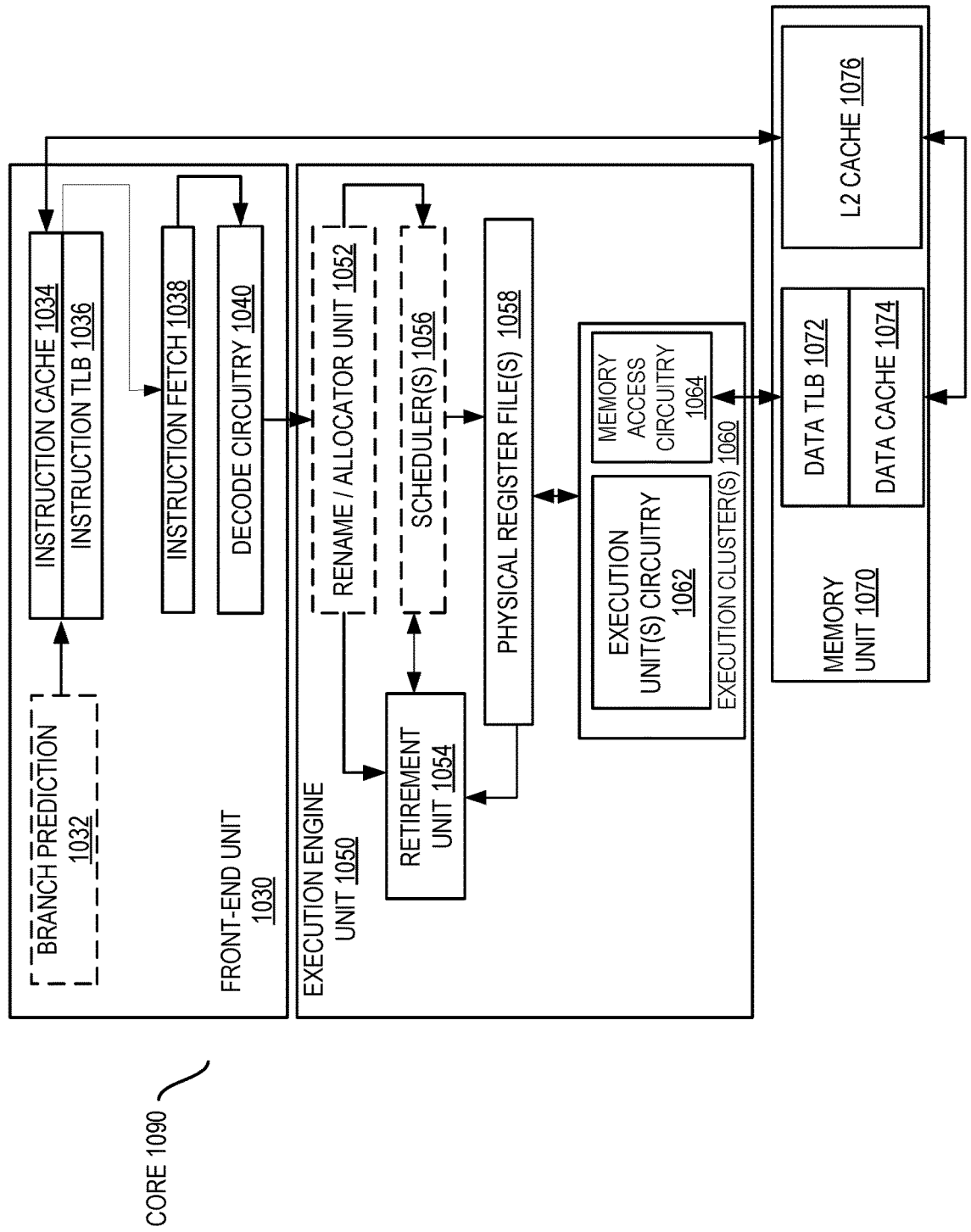
FIG. 10 is a block diagram of a processor core in accordance with an embodiment.

FIG. 10 shows a processor core 1090 including front-end unit circuitry 1030 coupled to execution engine unit circuitry 1050, and both are coupled to memory unit circuitry 1070. The core 1090 may be a reduced instruction set architecture computing (RISC) core, a complex instruction set architecture computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front-end unit circuitry 1030 may include branch prediction circuitry 1032 coupled to instruction cache circuitry 1034, which is coupled to an instruction translation lookaside buffer (TLB) 1036, which is coupled to instruction fetch circuitry 1038, which is coupled to decode circuitry 1040. In one example, the instruction cache circuitry 1034 is included in the memory unit circuitry 1070 rather than the front-end circuitry 1030. The decode circuitry 1040 (or decoder) may decode instructions, and generate as an output one or more micro-operations, micro-code entry points, microinstructions, other instructions, or other control signals, which are decoded from, or which otherwise reflect, or are derived from, the original instructions. The decode circuitry 1040 may further include address generation unit (AGU, not shown) circuitry. In one example, the AGU generates an LSU address using forwarded register ports, and may further perform branch forwarding (e.g., immediate offset branch forwarding, LR register branch forwarding, etc.). The decode circuitry 1040 may be implemented using various different mechanisms. Examples of suitable mechanisms include, but are not limited to, look-up tables, hardware implementations, programmable logic arrays (PLAs), microcode read only memories (ROMs), etc. In one example, the core 1090 includes a microcode ROM (not shown) or other medium that stores microcode for certain macroinstructions (e.g., in decode circuitry 1040 or otherwise within the front-end circuitry 1030). In one example, the decode circuitry 1040 includes a micro-operation (micro-op) or operation cache (not shown) to hold/cache decoded operations, micro-tags, or micro-operations generated during the decode or other stages of the processor pipeline 1000. The decode circuitry 1040 may be coupled to rename/allocator unit circuitry 1052 in the execution engine circuitry 1050.

The execution engine circuitry 1050 includes the rename/allocator unit circuitry 1052 coupled to retirement unit circuitry 1054 and a set of one or more scheduler(s) circuitry 1056. The scheduler(s) circuitry 1056 represents any number of different schedulers, including reservations stations, central instruction window, etc. In some examples, the scheduler(s) circuitry 1056 can include arithmetic logic unit (ALU) scheduler/scheduling circuitry, ALU queues, address generation unit (AGU) scheduler/scheduling circuitry, AGU queues, etc. The scheduler(s) circuitry 1056 is coupled to the physical register file(s) circuitry 1058. Each of the physical register file(s) circuitry 1058 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In one example, the physical register file(s) circuitry 1058 includes vector registers unit circuitry, writemask registers unit circuitry, and scalar register unit circuitry. These register units may provide architectural vector registers, vector mask registers, general-purpose registers, etc. The physical register file(s) circuitry 1058 is coupled to the retirement unit circuitry 1054 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 1054 and the physical register file(s) circuitry 1058 are coupled to the execution cluster(s) 1060. The execution cluster(s) 1060 includes a set of one or more execution unit(s) circuitry 1062 and a set of one or more memory access circuitry 1064. The execution unit(s) circuitry 1062 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1056, physical register file(s) circuitry 1058, and execution cluster(s) 1060 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1064). It should also be understood that where separate pipelines are used, one or more of these pipelines may be out-of-order issue/execution and the rest in-order.

In some examples, the execution engine unit circuitry 1050 may perform load store unit (LSU) address/data pipelining to an Advanced Microcontroller Bus (AMB) interface (not shown), and address phase and writeback, data phase load, store, and branches.

The set of memory access circuitry 1064 is coupled to the memory unit circuitry 1070, which includes data TLB circuitry 1072 coupled to data cache circuitry 1074 coupled to level 2 (L2) cache circuitry 1076. In one example, the memory access circuitry 1064 may include load unit circuitry, store address unit circuitry, and store data unit circuitry, each of which is coupled to the data TLB circuitry 1072 in the memory unit circuitry 1070. The instruction cache circuitry 1034 is further coupled to the level 2 (L2) cache circuitry 1076 in the memory unit circuitry 1070. In one example, the instruction cache 1034 and the data cache 1074 are combined into a single instruction and data cache (not shown) in L2 cache circuitry 1076, level 3 (L3) cache circuitry (not shown), and/or main memory. The L2 cache circuitry 1076 is coupled to one or more other levels of cache and eventually to a main memory.

The following examples pertain to further embodiments.

In one example, a processor comprises: a plurality of cores to execute instructions; a power controller to control power consumption of the plurality of cores, where the power controller is to receive network traffic metadata from a classifier and control the power consumption of at least one of the plurality of cores based at least in part on the network traffic metadata; and a hardware feedback circuit coupled to the plurality of cores, the hardware feedback circuit to determine hardware feedback information comprising an energy efficiency capability and a performance capability of at least some of the plurality of cores based at least in part on the network traffic metadata.

In an example, the processor further comprises a memory controller to receive the network traffic metadata, the memory controller to control a configuration of a memory hierarchy based at least in part on the network traffic metadata.

In an example, the processor further comprises a sideband interconnect to send the network traffic metadata to the memory controller.

In an example, the memory controller is to allocate a system cache to store information of a first thread based at least in part on the network traffic metadata.

In an example, the memory controller is to direct data of a second thread to at least one of the plurality of cores and not to the system cache, based at least in part on the network traffic metadata.

In an example, the power controller is to receive the network traffic metadata from a NIC, the NIC comprising the classifier, the classifier comprising a machine learning packet classifier.

In an example, the machine learning packet classifier is to: identify a first traffic class based on a first plurality of incoming packets; identify a second traffic class based on a second plurality of incoming packets; and provide the network traffic metadata comprising an identification of the first traffic class and the second traffic class to a scheduler.

In an example, the hardware feedback circuit is to provide to a scheduler the hardware feedback information comprising a first energy efficiency capability and a first performance capability of a first core, the scheduler to schedule one or more first threads of the first traffic class to the first core based at least in part on the first energy efficiency capability, the first performance capability of the first core, and the identification of the first traffic class.

In an example, the scheduler is to schedule a network bound workload to the first core, the first core comprising an efficiency core, the scheduler to identify the network bound workload based at least in part on the network traffic metadata.

In an example, the machine learning packet classifier is further to provide the network traffic metadata comprising the identification of the first traffic class and the second traffic class to the power controller, where the power controller is to cause a reduction in acoustic noise of a thermal solution based at least in part on the identification of one or more of the first traffic class or the second class, and where the scheduler is to schedule at least one of the first traffic class or the second traffic class to at least one core of a performance core type to increase user responsiveness.

In an example, the power controller is to park at least one core of a first core type and control a frequency of at least one core of a second core type based at least in part on the network traffic metadata, and a scheduler is to schedule a first thread to the at least one core of the second core type, the first thread comprising a file transfer workload, the first core type comprising a performance core type and the second core type comprising an efficiency core type.

In another example, a method comprises: receiving, from a classifier, network traffic metadata regarding incoming traffic to a system comprising the processor, the network traffic metadata comprising an indication of a type of the incoming traffic; and controlling operation of the processor based at least in part on the network traffic metadata, comprising: providing first hint information from a hardware feedback circuit of the processor to a scheduler based at least in part on the network traffic metadata, the scheduler, based at least in part on the first hint information and the network traffic metadata, to schedule threads to one or more first cores of a first core type and one or more second cores of a second core type; and controlling a frequency of at least the one or more first cores of the first core type, based at least in part on the network traffic metadata.

In an example, the method further comprises: providing the network traffic metadata to a memory controller of the system; and controlling, via the memory controller, operation of a memory of the system based at least in part on the network traffic metadata.

In an example, controlling the operation of the memory comprises: allocating a system cache to store information of a first thread based at least in part on the network traffic metadata; and directing information of a second thread to the processor and not to the system cache.

In an example, the method further comprises: receiving the network traffic metadata in the hardware feedback circuit; updating at least a portion of hardware feedback information based on the network traffic metadata; and providing the updated hardware feedback information to the scheduler.

In an example, controlling the operation of the processor based at least in part on the network traffic metadata comprises: parking at least one of the one or more first cores of the first core type; and scheduling at least one thread to at least one of the one or more second cores of the second core type, the at least one thread comprising a non-real time workload, the first core type comprising a performant core type and the second core type comprising an efficient core type.

In an example, the method further comprises receiving the network traffic metadata via a sideband interconnect coupled between the processor and a wireless communication circuit comprising the classifier to identify the type of incoming traffic.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a system includes a processor comprising: a first plurality of cores to execute instructions; a second plurality of cores to execute instructions, the second plurality of cores heterogenous to the first plurality of cores; a power controller to control, based at least in part on network traffic metadata, power consumption of the first plurality of cores and the second plurality of cores; and a hardware feedback circuit coupled to the plurality of cores, the hardware feedback circuit to provide, based at least in part on the network traffic metadata, hint information to a scheduler to cause the scheduler to schedule a workload on one or more of the second plurality of cores, the second plurality of cores having lower power consumption than the first plurality of cores. The system further includes a memory hierarchy coupled to the processor, the memory hierarchy comprising a system memory and a system cache coupled to the system memory. The system also includes a memory controller coupled to the memory hierarchy, the memory controller to control, based at least in part on the network traffic metadata, a configuration of the memory hierarchy.

In an example, the system further comprises a network interface circuit coupled to the processor, the network interface circuit comprising a classifier to determine the network traffic metadata based on a plurality of packets communicated through the network interface circuit.

In an example, the network interface circuit is to send the network traffic metadata to the processor via a sideband interconnect.

In another example, an apparatus comprises: means for receiving, from a classifier, network traffic metadata regarding incoming traffic to a system comprising a processor means, the network traffic metadata comprising an indication of a type of the incoming traffic; and means for controlling operation of the processor means based at least in part on the network traffic metadata, comprising: providing first hint information from a hardware feedback means to a scheduler means based at least in part on the network traffic metadata, the scheduler means, based at least in part on the first hint information and the network traffic metadata, for scheduling threads to one or more first core means of a first core type and one or more second core means of a second core type; and means for controlling a frequency of at least the one or more first core means of the first core type, based at least in part on the network traffic metadata.

In an example, the apparatus further comprises: means for providing the network traffic metadata to a memory controller means, the memory controller means for controlling operation of a memory means based at least in part on the network traffic metadata.

In an example, the apparatus further comprises means for allocating a system cache means for storing information of a first thread based at least in part on the network traffic metadata; and means for directing information of a second thread to the processor means and not to the system cache means.

In an example, the apparatus further comprises: means for receiving the network traffic metadata in the hardware feedback means; means for updating at least a portion of hardware feedback information based on the network traffic metadata; and means for providing the updated hardware feedback information to the scheduler means.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A processor comprising:
   a plurality of cores to execute instructions;
   a power controller to control power consumption of the plurality of cores, wherein the power controller is to receive network traffic metadata from a classifier and control the power consumption of at least one of the plurality of cores based at least in part on the network traffic metadata; and
   a hardware feedback circuit coupled to the plurality of cores, the hardware feedback circuit to determine hardware feedback information comprising an energy efficiency capability and a performance capability of at least some of the plurality of cores based at least in part on the network traffic metadata.

2. The processor of claim 1, wherein the processor further comprises a memory controller to receive the network traffic metadata, the memory controller to control a configuration of a memory hierarchy based at least in part on the network traffic metadata.

3. The processor of claim 2, wherein the processor further comprises a sideband interconnect to send the network traffic metadata to the memory controller.

4. The processor of claim 2, wherein the memory controller is to allocate a system cache to store information of a first thread based at least in part on the network traffic metadata.

5. The processor of claim 4, wherein the memory controller is to direct data of a second thread to at least one of the plurality of cores and not to the system cache, based at least in part on the network traffic metadata.

6. The processor of claim 1, wherein the power controller is to receive the network traffic metadata from a network interface circuit (NIC), the NIC comprising the classifier, the classifier comprising a machine learning packet classifier.

7. The processor of claim 6, wherein the machine learning packet classifier is to:
   identify a first traffic class based on a first plurality of incoming packets;
   identify a second traffic class based on a second plurality of incoming packets; and
   provide the network traffic metadata comprising an identification of the first traffic class and the second traffic class to a scheduler.

8. The processor of claim 7, wherein the hardware feedback circuit is to provide to the scheduler the hardware feedback information comprising a first energy efficiency capability and a first performance capability of a first core, the scheduler to schedule one or more first threads of the first traffic class to the first core based at least in part on the first energy efficiency capability, the first performance capability of the first core, and the identification of the first traffic class.

9. The processor of claim 8, wherein the scheduler is to schedule a network bound workload to the first core, the first core comprising an efficiency core, the scheduler to identify the network bound workload based at least in part on the network traffic metadata.

10. The processor of claim 7, wherein the machine learning packet classifier is further to provide the network traffic metadata comprising the identification of the first traffic class and the second traffic class to the power controller, wherein the power controller is to cause a reduction in acoustic noise of a thermal solution based at least in part on the identification of one or more of the first traffic class or the second class, and wherein the scheduler is to schedule at least one of the first traffic class or the second traffic class to at least one core of a performance core type to increase user responsiveness.

11. The processor of claim 1, wherein the power controller is to park at least one core of a first core type and control a frequency of at least one core of a second core type based at least in part on the network traffic metadata, and a scheduler is to schedule a first thread to the at least one core of the second core type, the first thread comprising a file transfer workload, the first core type comprising a performance core type and the second core type comprising an efficiency core type.

12. At least one computer readable medium comprising instructions, which when executed by a processor, cause the processor to execute a method comprising:
receiving, from a classifier, network traffic metadata regarding incoming traffic to a system comprising the processor, the network traffic metadata comprising an indication of a type of the incoming traffic; and
controlling operation of the processor based at least in part on the network traffic metadata, comprising:
providing first hint information from a hardware feedback circuit of the processor to a scheduler based at least in part on the network traffic metadata, the scheduler, based at least in part on the first hint information and the network traffic metadata, to schedule threads to one or more first cores of a first core type and one or more second cores of a second core type; and
controlling a frequency of at least the one or more first cores of the first core type, based at least in part on the network traffic metadata.

13. The at least one computer readable medium of claim 12, wherein the method further comprises:
providing the network traffic metadata to a memory controller of the system; and
controlling, via the memory controller, operation of a memory of the system based at least in part on the network traffic metadata.

14. The at least one computer readable medium of claim 13, wherein controlling the operation of the memory comprises:

allocating a system cache to store information of a first thread based at least in part on the network traffic metadata; and
directing information of a second thread to the processor and not to the system cache.

15. The at least one computer readable medium of claim 12, wherein the method further comprises:
receiving the network traffic metadata in the hardware feedback circuit;
updating at least a portion of hardware feedback information based on the network traffic metadata; and
providing the updated hardware feedback information to the scheduler.

16. The at least one computer readable medium of claim 12, wherein controlling the operation of the processor based at least in part on the network traffic metadata comprises:
parking at least one of the one or more first cores of the first core type; and
scheduling at least one thread to at least one of the one or more second cores of the second core type, the at least one thread comprising a non-real time workload, the first core type comprising a performant core type and the second core type comprising an efficient core type.

17. The at least one computer readable medium of claim 12, wherein the method further comprises receiving the network traffic metadata via a sideband interconnect coupled between the processor and a wireless communication circuit comprising the classifier to identify the type of incoming traffic.

18. A system comprising:
a processor comprising:
a first plurality of cores to execute instructions;
a second plurality of cores to execute instructions, the second plurality of cores heterogenous to the first plurality of cores;
a power controller to control, based at least in part on network traffic metadata, power consumption of the first plurality of cores and the second plurality of cores; and
a hardware feedback circuit coupled to at least the second plurality of cores, the hardware feedback circuit to provide, based at least in part on the network traffic metadata, hint information to a scheduler to cause the scheduler to schedule a workload on one or more of the second plurality of cores, the second plurality of cores having lower power consumption than the first plurality of cores;
a memory hierarchy coupled to the processor, the memory hierarchy comprising a system memory and a system cache coupled to the system memory; and
a memory controller coupled to the memory hierarchy, the memory controller to control, based at least in part on the network traffic metadata, a configuration of the memory hierarchy.

19. The system of claim 18, further comprising a network interface circuit coupled to the processor, the network interface circuit comprising a classifier to determine the network traffic metadata based on a plurality of packets communicated through the network interface circuit.

20. The system of claim 19, wherein the network interface circuit is to send the network traffic metadata to the processor via a sideband interconnect.

* * * * *